(12) United States Patent
Quirke et al.

(10) Patent No.: US 7,938,154 B2
(45) Date of Patent: May 10, 2011

(54) TIMBER-WORKING HEAD WITH FEED WHEEL ADAPTOR PLATE

(75) Inventors: Peter Quirke, Tokoroa (NZ); Alex J. Stevenson, Paparnoa (NZ); Paul Gambie, Taupo (NZ)

(73) Assignee: Waratah NZ Limited, Tokoroa (NZ)

( * ) Notice: Subject to any disclaimer, the term of this patent is extended or adjusted under 35 U.S.C. 154(b) by 69 days.

(21) Appl. No.: 12/483,296

(22) Filed: Jun. 12, 2009

(65) Prior Publication Data
US 2010/0313997 A1 Dec. 16, 2010

(51) Int. Cl.
*A01G 23/00* (2006.01)

(52) U.S. Cl. ......... 144/4.1; 144/34.1; 144/34.5; 56/10.1

(58) Field of Classification Search ............... 144/4.1, 144/34.1, 34.5, 24.12, 24.13; 83/928; 56/10.1, 56/12.7, 13.5, 14.1
See application file for complete search history.

(56) References Cited

U.S. PATENT DOCUMENTS

| | | | |
|---|---|---|---|
| 3,394,744 A * | 7/1968 | Vit | ................................. 144/337 |
| 4,725,018 A | 2/1988 | Young | |
| 5,673,756 A | 10/1997 | Classen | |
| 5,954,105 A | 9/1999 | Smith et al. | |
| 5,957,177 A * | 9/1999 | Smith et al. | ................. 144/248.7 |
| 6,135,726 A | 10/2000 | Robertson et al. | |
| 6,345,651 B1 * | 2/2002 | Havimaki et al. | ........... 144/24.13 |

FOREIGN PATENT DOCUMENTS

| | | |
|---|---|---|
| CA | 2196728 | 2/1997 |
| CN | 2465452 Y | 12/2001 |
| CN | 2652108 Y | 11/2004 |
| JP | 7172101 A | 7/1995 |

OTHER PUBLICATIONS

Images of HTH622B_1 (prior art) (1 page), known prior to Jun. 12, 2009.
Images of HTH622B_2 (prior art) (1 page), known prior to Jun. 12, 2009.
HTH600 Series Product Brochure (Sep. 2007) (12 pages).
HTH616 Product Brochure (prior art) (2 pages), known prior to Jun. 12, 2009.
HTH622 Product Brochure (prior art) (2 pages), known prior to Jun. 12, 2009.
HTH624C Product Brochure (prior art) (3 pages), known prior to Jun. 12, 2009.
HTH626 Product Brochure (prior art) (2 pages), known prior to Jun. 12, 2009.
Image of Valmet Product (prior art) (1 page), known prior to Jun. 12, 2009.
Images of HTH616 Harvesting Head (prior art) (6 pages), known prior to Jun. 12, 2009.
Images of HTH616 Valve Cover and Saw Section Housing (prior art) (6 pages), known prior to Jun. 12, 2009.

(Continued)

*Primary Examiner* — Shelley Self

(57) ABSTRACT

A timber-working head comprises a first motor, a second motor, a feed wheel, and an adaptor plate. The first motor comprises a first rotary output element. The second motor comprises a second rotary output element. The feed wheel is fixed to the first rotary output element for rotation therewith. The adaptor plate fixed to the second rotary output element for rotation therewith. The adaptor plate comprises radial projections arranged about the periphery of the adaptor plate and received respectively within corresponding axially recessed portions of the feed wheel so as to provide an operational interface between the adaptor plate and the feed wheel.

18 Claims, 5 Drawing Sheets

OTHER PUBLICATIONS

Images of HTH622B Harvesting Head (prior art) (6 pages), known prior to Jun. 12, 2009.
Images of HTH622B Valve Cover (prior art) (6 pages), known prior to Jun. 12, 2009.
Images of HTH624C Harvesting Head known (prior art) (6 pages), known prior to Jun. 12, 2009.
Images of HTH624C Valve Cover (prior art) (6 pages), known prior to Jun. 12, 2009.
Images of Saw Section Housing of HTH622B Harvesting:dead (prior art) (6 pages), known prior to Jun. 12, 2009.
Images of Saw Section Housing of HTH624C Harvesting Head (prior art) (6 pages), known prior to Jun. 12, 2009.
Ponsse Product Brochure (2005) (2 pages).
TimberRite Product Brochure (Aug. 2008) (6 pages).
Valmet Product Brochure (Nov. 2007) (2 pages).
Background Information (2 pages) (prior art), known prior to Jun. 12, 2009.
Compabloc Brochure (6 pages) (prior art), known prior to Jun. 12, 2009.
HTH 624C Frame-Mounted Drive (1 page) (Aug. 2007).
Images of Hubcentric Spacers (3 pages) (prior art), known prior to Jun. 12, 2009.
TWVW Orbital Motor Service and Parts Manual (16 pages) (Oct. 2004).
TWVW Orbital Motors Technical Information (16 pages) (Oct. 2004).
Turf Machinery Services—Hydraulic Wheel Motor (1 page) (Feb. 4, 2007).
JP 7172101 (English Abstract) (1 page), known prior to Jun. 12, 2009.
CN 2652108 (English Abstract) (1 page), known prior to Jun. 12, 2009.
CN 2465452 (English Abstract) (1 page), known prior to Jun. 12, 2009.

* cited by examiner

TIMBER-WORKING HEAD WITH FEED WHEEL ADAPTOR PLATE

FIELD OF THE DISCLOSURE

The present disclosure relates to a timber-working head, and, more particularly, to a frame-mounted drive of the timber-working head.

BACKGROUND OF THE DISCLOSURE

It is well-known to mount a timber-working head in the form of a harvesting head to a carrier to perform a number of functions in connection with timber. For example, the head may be used to grapple and fell a standing tree and process the felled tree by delimbing, possibly debarking (depending on the configuration of the head), and cutting a trunk of the tree into logs (e.g., logs of predetermined length). Processing the felled tree typically involves feeding the felled tree in axially opposite directions, as needed, along a feed axis while grappling the tree.

The feed mechanism of the head may take a variety of forms. For example, as with the well-known Waratah HTH624C, the feed mechanism may have two arm-mounted drives and a frame-mounted drive synchronized with the arm-mounted drives. Each arm-mounted drive has a feed wheel mounted at the end of a respective feed arm pivotal relative to the frame and operable by a hydraulic motor of the arm-mounted drive.

The frame-mounted drive has a feed wheel mounted in a cavity of the frame and operable by two hydraulic motors of the frame-mounted drive each of which is bolted to the frame and arranged in flow-series with the motor of a respective arm-mounted drive. Each motor of the frame-mounted drive comprises a rotary output element in the form of an externally splined shaft received in an internally splined center hub bolted to the feed wheel for rotation of the feed wheel, center hub, and shafts about a rotation axis. As such, the rotational speed of the feed wheels of the arm-mounted and frame-mounted feed wheels is synchronized, irrespective of torque demand.

The assembly process of the frame-mounted drive is somewhat involved. It includes bolting the center hub to the feed wheel and inserting the center hub/feed wheel assembly into a cavity of the frame. Both sides of the internal spline of the center hub are greased. A first of the motors of the frame-mounted drive is fitted into the frame, the shaft of the first motor and the center hub are connected via the splines thereof, and the first motor is then bolted to the frame. The second motor of the frame-mounted drive is fitted into the frame with a standard shim set between the second motor and the frame, the shaft of the second motor and the center hub are connected via the splines thereof, and the second motor is then bolted to the frame. A dial gauge is used to measure the float of the center hub/feed wheel assembly on the motor shafts axially along the rotation axis. The second motor is unbolted, and the amount of shims required to eliminate such axial float and apply approximately 0.005 inch compression on the seals located between the center hub and the motor housings is removed. The first motor, with the correct number of shim(s), is re-assembled into the frame, to complete assembly of the frame-mounted drive.

Regarding maintenance, the splined connected between the internally splined center hub and the externally splined motor shafts needs to be greased periodically (e.g., every 200-250 hours of operation in hardwood applications and every 1000 hours of operation in softwood applications). To do so, a technician typically enters a caution zone (located between the feed arms) to access the frame-mounted drive, and disassembles the center hub/feed wheel assembly from the motor shafts to re-grease both ends of the center hub. The frame-mounted drive, with its re-greased center hub/feed wheel assembly, is then re-assembled.

SUMMARY OF THE DISCLOSURE

According to an aspect of the present disclosure, there is provided a timber-working head. The head comprises a frame, a first motor, a second motor, a feed wheel, and an adaptor plate. The first motor is mounted to the frame and comprises a first rotary output element. The second motor is mounted to the frame and comprises a second rotary output element. The feed wheel is fixed to the first rotary output element for rotation therewith. The adaptor plate fixed to the second rotary output element for rotation therewith. The adaptor plate comprises radial projections arranged about the periphery of the adaptor plate and received respectively within corresponding axially recessed portions of the feed wheel so as to provide an operational interface between the adaptor plate and the feed wheel.

The above and other features will become apparent from the following description and the coupled drawings.

BRIEF DESCRIPTION OF THE DRAWINGS

The detailed description of the drawing refers to the accompanying figures in which.

DETAILED DESCRIPTION OF THE DRAWINGS

Figure 1:
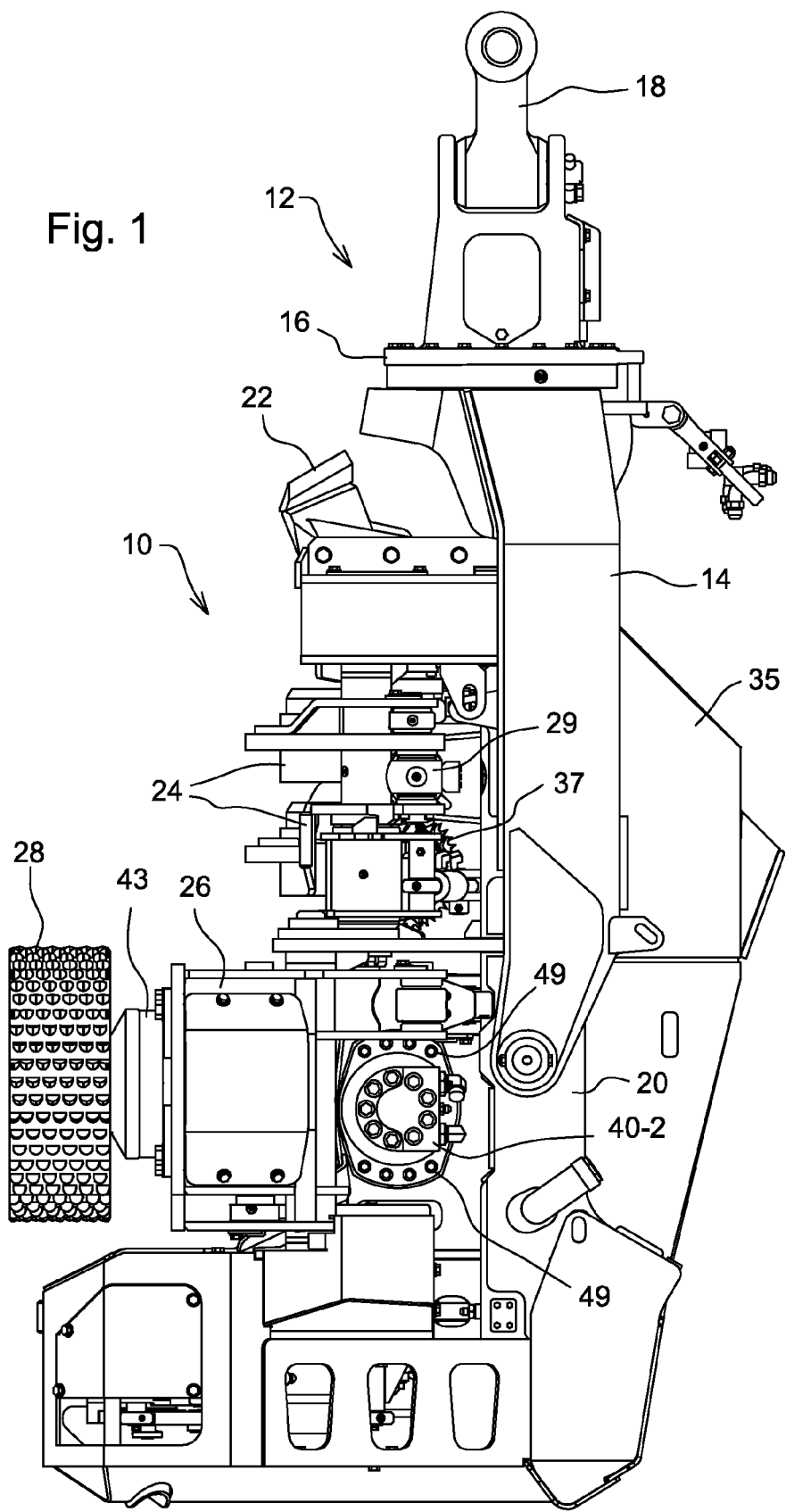
FIG. 1 is a perspective view of a timber-working head.

Referring to FIG. 1, there is shown a timber-working head 10. The head 10 is illustrated, for example, as a harvesting head capable of grappling, felling, delimbing, and cutting a tree into one or more logs of predetermined length. It may also be configured to debark the tree or logs thereof.

The head 10 is attachable to the articulated boom or other support structure of a carrier (not shown), using, for example, a hanger 12, for manipulation by an operator located in an operator's station of a base machine of the carrier. The hanger 12 may have a hanging bracket 14 to which the head 10 is coupled for pivotal movement between a generally upright, harvesting position for felling a tree and a generally prone, processing position for processing the felled tree (e.g., delimbing, debarking, cutting to length) or other timber, a hydraulic rotator 16 coupled to the hanging bracket 14 for rotating the head 10 and bracket 14, and a dog-bone joint 18 interconnecting the rotator 16 and the boom.

Figure 2:
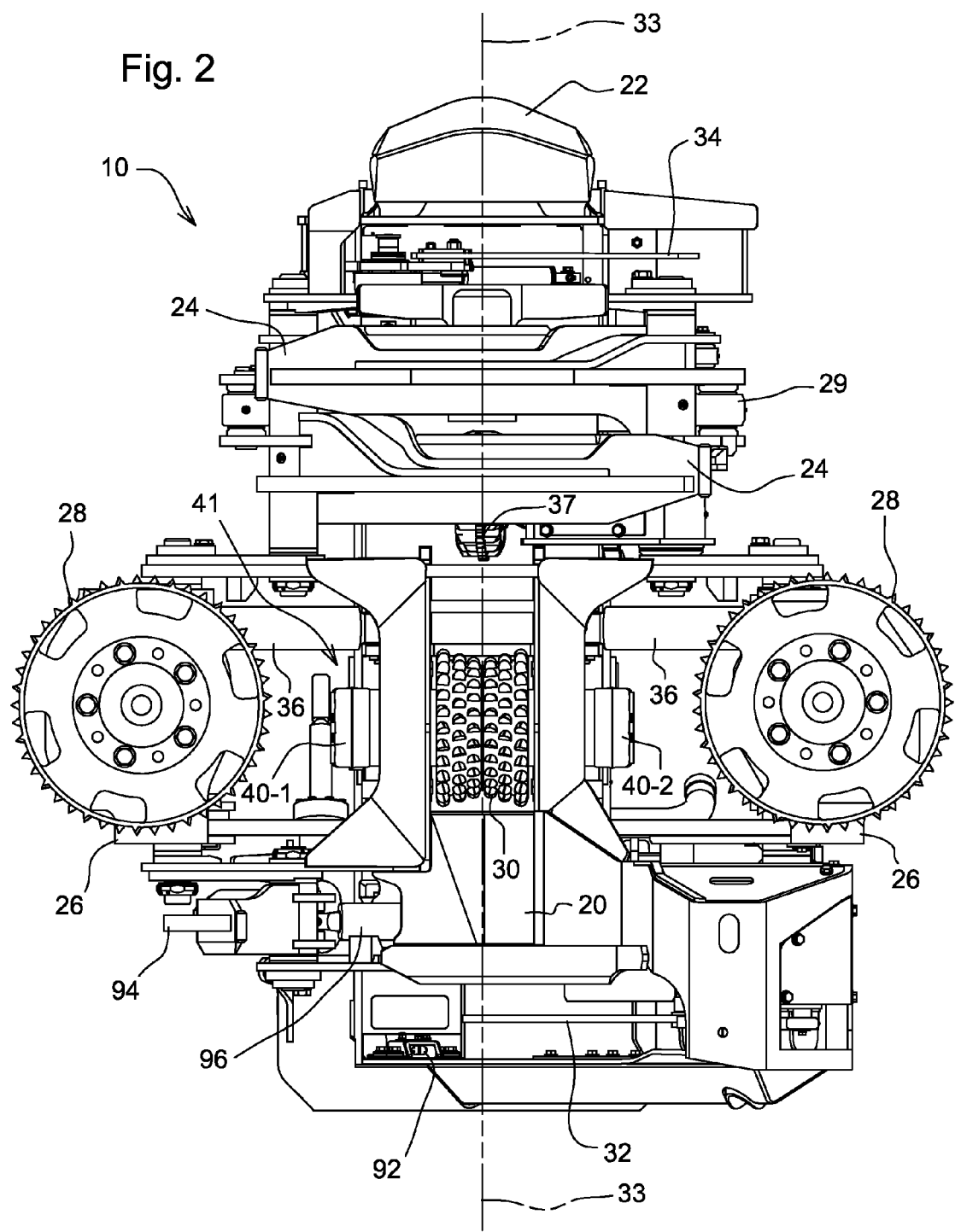
FIG. 2 is a front elevation view of the timber-working head.

Referring to FIG. 2, exemplarily, the head 10 has a frame 20, a stationary delimb knife 22, a pair of upper delimb arms 24 (right-hand (RH) and left-hand (LH)), a lower delimb arm 25, a pair of feed arms 26 (RH and LH), a pair of arm-mounted feed wheels 28 (LH and RH), a frame-mounted feed wheel 30, a felling saw 32 in the form of a chain saw (chain not shown), a topping saw 34 in the form of a chain saw (chain not shown). The head 10 further includes a number of other components including a valve block mounted to the rear side of a torso or body back of the frame 20 under a cover 35, various actuators, hydraulic motors, sensors, electrical lines and hoses (not shown), etc. The stationary delimb knife 22 is welded to the top of the frame 20 against movement relative thereto and is configured to delimb timber (i.e., a tree or log whether delimbed or undelimbed and debarked or undebarked) held by and translated along a feed axis 33 of the head 10. The knife 22 can be replaced by cutting the weld and welding a fresh knife to the frame 20. The two upper delimb arms 24 are pivotally coupled to the frame 20 to open and close relative thereto using a single hydraulic cylinder 29 and are configured to embrace and delimb the timber upon translation of the timber within the head 10 along the feed axis 33. The head 10 may also have a lower delimb arm 94 pivotally coupled to the frame 20 to open and close relative thereto using a hydraulic cylinder 96 coupled to the frame 20 and the lower delimb arm 94.

The feed arms 26 are pivotally coupled to the frame 20 to open and close relative thereto using respective hydraulic cylinders 36. The feed wheels 28 are coupled respectively to the ends of the feed arms 26 so as to be carried thereby for pivotal movement relative to the frame 20 to embrace and release the timber.

The feed wheel 30 is mounted to the frame 20 such that its rotation axis 31 is stationary relative to the frame 20. Details of how the feed wheel 30 is mounted and driven are discussed in more detail below.

During a felling operation, the operator maneuvers the head 10 into proximity to a standing tree and embraces the tree with delimb arms 24 and the feed arms 26/feed wheels 28. The felling saw 32, configured as a chain saw (saw bar shown but not chain), is actuated so as to cut through and fell the tree. Skilled operators sometimes begin processing as the felled tree is falling.

During processing, the felled tree may then be translated in opposite first and second directions along the feed axis 33. To do so, the feed wheels 28, 30 are driven hydraulically in rotational forward and reverse directions. During such translation, the stationary delimb knife 22 and delimb arms 24 delimb the tree, and the tree may also be debarked by use of well-known debarking techniques (e.g., use of debarking-type wheels for the feed wheels 28, 30 and/or opposite angling of the feed arms 26 and the wheels 28 relative to the frame 20 to add rotation to the tree).

Once the tree has been sufficiently delimbed and debarked, as applicable, the operator may wish to cut the tree into logs of predetermined length. A photosensor 92 (e.g., photocell), located at the felling saw end of the head 10 a short distance axially offset from the saw 32, is configured to sense the butt end of the tree to define an initial datum point from which to start measuring the predetermined length of the first log (accounting for the axial offset between the photosensor 92 and the saw 32 in the control software). A toothed measuring wheel 37 of the head 10 engages the surface of the tree and rotates against the tree upon feeding of the tree along the feed axis 33. When the tree has been fed the predetermined length, the saw 32 is activated to cut the first log from the tree. Depending on the available length of the tree, subsequent logs may be cut from the tree in the same manner, with the exception that the final log may be cut using the topping saw 34 to maximize value recovery of the tree.

In other operations, the head 10 may be used to process an already-felled tree or logs thereof. The head 10 may also be used to process simultaneously multiple trees or logs of sufficiently small diameter, although processing only one at a time would be more typical.

A hydraulic feed circuit includes a pair of hydraulic motors 43 (RH and LH) (a portion of the LH motor 43 shown in FIG. 1 with the rest positioned inside the LH feed arm 26) and a pair of hydraulic motors 40-1, 40-2 (RH and LH). The RH and LH motors 43 are operatively coupled respectively to the arm-mounted RH and LH feed wheels 28 to rotate the wheels 28 in forward and reverse directions. Each motor 43 is, for example, a model MS-11 of Poclain Hydraulics Industrie (which is commercially available) or other suitable motor. The RH and LH motors 40-1, 40-2 are provided for the single frame-mounted feed wheel 30. Each motor 40-1, 40-2 is, for example, a low-speed, high-torque, bi-directional orbital hydraulic motor, such as a wheel flange-spigot motor in the form of, for example, a Sauer-Danfoss TMVW 500 orbital motor (illustrated) (which is commercially available) or other suitable motor. Each wheel 28 and its associated motor 43 are included in an arm-mounted drive. The feed wheel 30 and the two motors 40-1, 40-2 are included in a frame-mounted drive 41.

Each motor 40-1, 40-2 is paired fluidly with the motor of a respective one of the two arm-mounted drives. The RH motor 40-1 and the motor of the RH arm-mounted drive are fluidly coupled to one another in flow-series relationship to provide a RH motor unit. Similarly, the LH motor 40-2 and the motor of the LH arm-mounted drive are fluidly coupled to one another in flow-series relationship to provide a LH motor unit. The two motor units are fluidly coupled to one another in flow-parallel relationship, while the motors 40-1, 40-2 are mechanically coupled to one another using the feed wheel 30, as discussed in more detail below. As such, the rotational speed of the feed wheels 28 and 30 is synchronized, irrespective of torque demand. The hydraulic feed circuit therefore prevents fluid runaway to the feed wheel 28, 30 having the lowest pressure demand. This ensures that when one or more feed wheels momentarily lose contact with a log due to surface discontinuities or abrupt dimensional variances as may be caused during the processing of a crooked tree, the remaining feed wheels in contact with the log will continue to be operational at the intended rate of hydraulic fluid supply.

Figure 3:
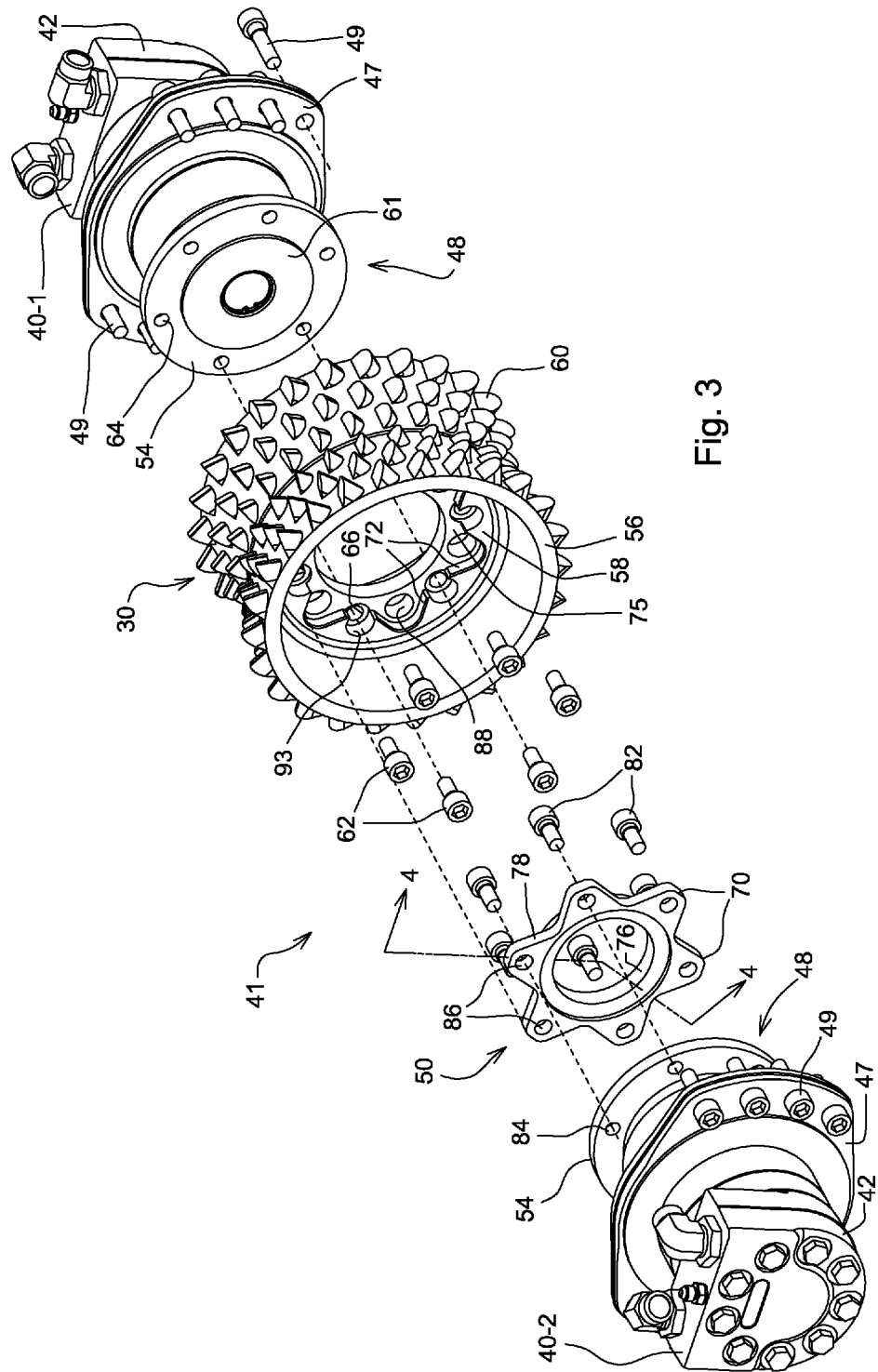
FIG. 3 is an exploded perspective view of a frame-mounted drive of the head.
Figure 4:
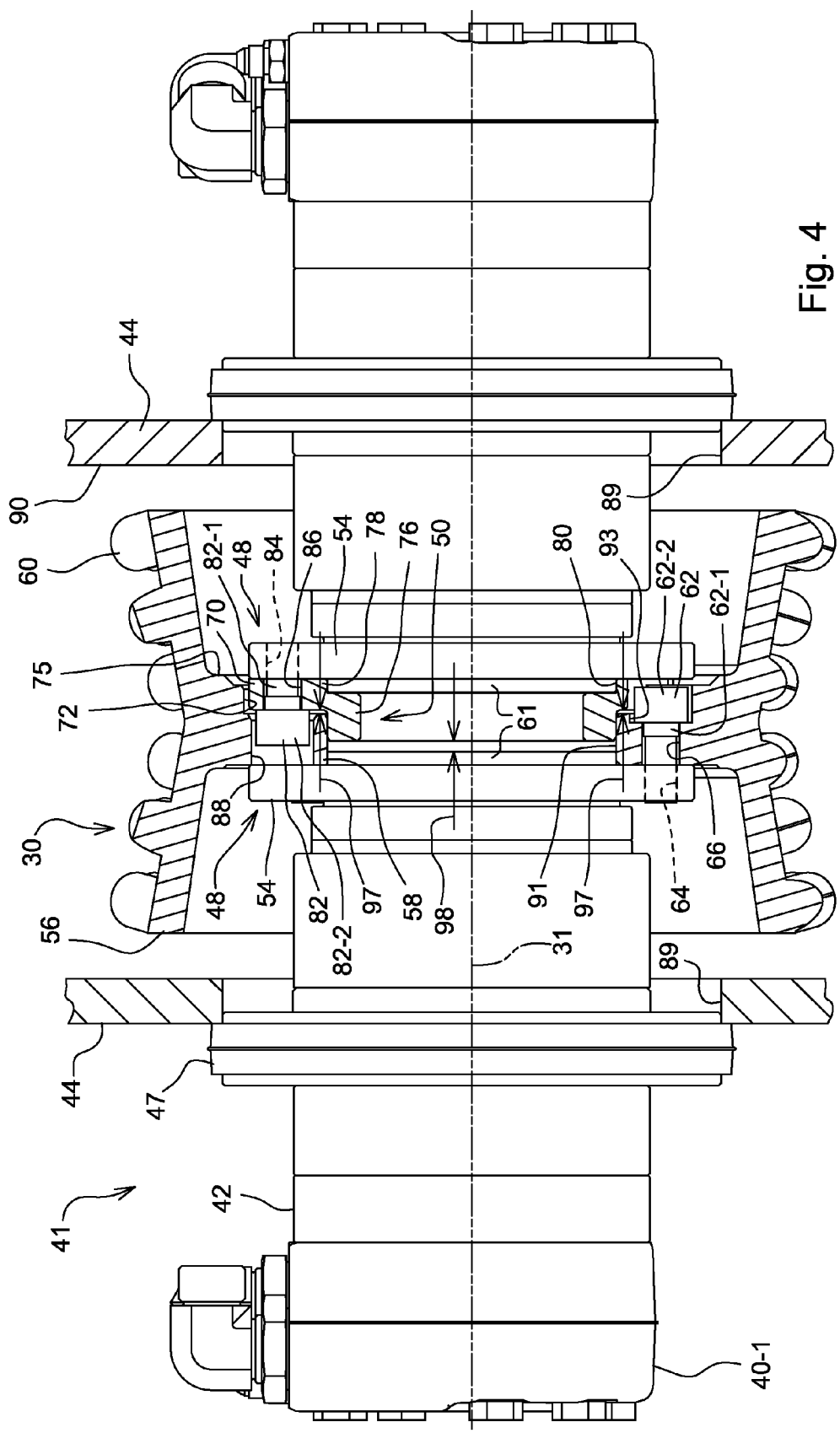
FIG. 4 is a sectional view taken along lines 4-4 of FIG. 3.
Figure 5:
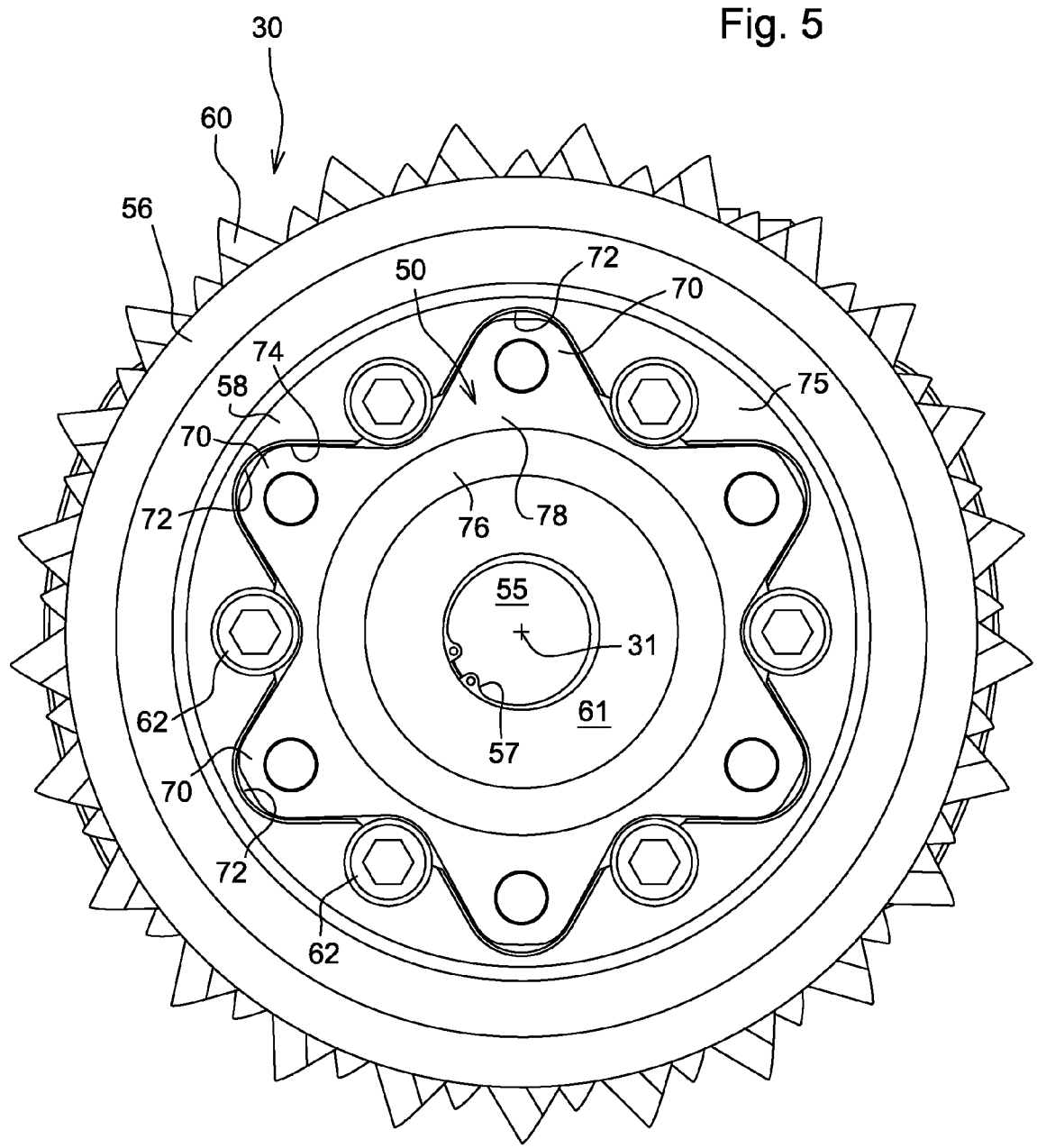
FIG. 5 is a right elevation view, with portions broken away, showing an adaptor plate with radial projections received in corresponding axially recessed portions of a feed wheel.

Referring to FIGS. 3-5, there is shown the frame-mounted drive 41. The frame-mounted drive 41 comprises the motors 40-1, 40-2, the feed wheel 30, and an adaptor plate 50 in the form of, for example, an adaptor flange. Each motor 40-1, 40-2 has a housing 42 mounted to the frame 20 in fixed relation thereto. Exemplarily, each housing 42 has a flange 47 mounted onto a respective wall 44 of the frame 20 using fasteners 49. Each fastener 49 is configured, for example, as a screw (e.g., DIN 912 M16×55 with quality grade 12.9) extending through the flange 47 into a respective internally threaded through-hole formed in the wall 44 so as to be threaded to that through-hole. There are, for example, eight such fasteners 49, four on either side of the flange 47 (with respect to each motor 40-1, 40-2, the four in the foreground of FIG. 4 have been removed for clarity). The RH and LH motors 40-1, 40-2 further have respective RH and LH rotary output elements 48 rotatable about an axis 31.

The feed wheel 30 is mechanically coupled to the RH and LH rotary output elements 48 of the RH and LH motors 40-1, 40-2. The feed wheel 30 is fixed to the RH rotary output element 48 for rotation therewith and is mechanically coupled to the LH rotary output element 48 using the adaptor plate 50.

Each rotary output element 48 is configured as a disk-shaped mounting flange 54. The mounting flange of the RH rotary output element 48 is referred to below as the RH mounting flange 54 and the mounting flange of the LH rotary output element 48 is referred to below as the LH mounting flange 54.

As alluded to above, each motor 40-1, 40-2 may be a Sauer-Danfoss TMVW 500 orbital motor such that each mounting flange 54 may be part of a one-piece rotary output having a tubular shaft extending axially within the housing 42 and from which the flange 54 extends radially outwardly. Such tubular shaft may be mounted within a pair of tapered roller bearings for rotation within the housing 42, and may receive a Cardan shaft (not shown) having opposite, externally splined end portions one of which mates with an internally splined portion of the tubular shaft for rotation of the rotary output therewith. The Cardan shaft may be included in a gearwheel set module connected to a valve module, both modules of which may be included in the motor. The flange 54 may include a spigot 61 stepped axially outwardly from the peripheral portion of the flange 54. The one-piece rotary output may be machined from one piece of steel. An externally threaded plug 55 may be threaded into an internally threaded hole of the flange 54, with an O-ring therebetween (not shown) and a retaining ring 57 (e.g., circlip) to keep the plug 55 from backing out. The Sauer Danfoss "TMVW Orbital motor Service and Parts Manual TMVW motor," Revision A, October 2004, is incorporated by reference herein. In other embodiments, the motors 40-1, 40-2 may be configured in some other suitable form.

The feed wheel 30 has a rim 56 and a hub 58 about which the rim 56 is fixed. Illustratively, the feed wheel 30 may be a one-piece component (e.g., a casting). The one-piece component may be made, for example, of any steel such as any hard-wearing steel in the form of, for example, cast steel.

The rim 56 may be V-shaped with circumferential rows of thumbnails 60, or other tree-engaging projections, on the outer surface of the rim 56. The V shape of the rim 56 urges a tree held by the head 10 toward the axial center of the wheel 30, to inhibit migration of the tree off the wheel 30. The thumbnails 60 may vary in height from the outer surface of the rim 56. For example, the thumbnails 60 increase in height from the axial center of the rim 56, where engagement of a smaller diameter tree can occur, toward the axial ends of the rim 56, where engagement of a larger diameter tree can occur, such that the depth of penetration of the trees by the thumbnails 60 corresponds to the diameter of the trees, resulting in more penetration for larger trees and less penetration for smaller diameter trees.

The feed wheel 30 is fixed to the RH rotary output element 48 of the RH motor 40-1. The hub 58 of the feed wheel 30 is positioned about a spigot 61 of the RH mounting flange 54 (e.g., RH spigot 61 is integrated into the RH flange 54) such that the RH spigot 61 is positioned within a central hub through-hole 91 of the hub 58. As illustrated, the RH spigot 61 may engage the through-hole 91.

The hub 58 is fixed to the RH mounting flange 54 using fasteners 62 configured, for example, as screws (e.g., DIN 912 M16×30 with quality grade 12.9). The RH mounting flange 54 has a plurality of flange holes 64 (illustratively through-holes) internally threaded to mate respectively with the externally threaded fasteners 62. The hub 58 has a plurality of unthreaded hub through-holes 66 and a plurality of unthreaded head-receiving recessed portions 93. Each hub through-hole 66 is larger in diameter than the shank 62-1 of the fastener 62 to be received thereby. The inner diameter of each head-receiving recessed portion 93 is larger than the outer diameter of the head 62-2 of the fastener 62 to be received thereby.

The head-receiving recessed portions 93, the hub through-holes 66, and the flange holes 64 are respectively axially aligned with one another. The shank 62-1 of each fastener 62 extends through a respective one of the hub through-holes 66 of the feed wheel 30 into a respective one of the flange holes 64 so as to be threaded thereto. The head 62-2 of each fastener 62 is positioned within a respective one of the head-receiving recessed portions 93 and is arranged in axial face-to-face contact with a respective face of the head-receiving recessed portion 93. The hub 58 is thereby fastened to the RH mounting flange 54, coupling the wheel 30 to the RH mounting flange 54.

The adaptor plate 50 is fixed to the LH rotary output element 48 for rotation therewith. The adaptor plate 50 comprises radial projections 70 arranged about the periphery of the adaptor plate 50 and received respectively within generally corresponding axially recessed portions 72 of hub 58 of the feed wheel 30 so as to mate therewith and provide an operational interface 74 between the adaptor plate 50 and the feed wheel 30. Exemplarily, each projection 70 is configured as a lobe (e.g., generally trapezoidal), and each recessed portion 72 has a generally matching profile, as shown, for example, in FIG. 5; the shape of the lobe and the shape of the recessed portion 72 need not match exactly in order to provide sufficient operational contact therebetween. The recessed portions 72 are formed in an axially-facing wall 75 of the hub 58 such that they are recessed axially into the hub 58. The hub 58 defines a radially-extending end surface of each recessed portion 72. The adaptor plate 50 is, for example, a medium strength steel plate (e.g., GR350 steel plate) with a tensile strength of 450-620 MPa and a yield strength of 350 MPa.

The adaptor plate 50 comprises a hub 76 and a peripheral ring 78 that is positioned radially outward of the hub 76 and comprises the projections 70. The projections 70 are spaced circumferentially evenly about the ring 78 in a pattern, with the recessed portions 72 arranged in a corresponding pattern. There are, for example, six projections 70 arranged in a star pattern, with six corresponding recessed portions 72. The adaptor plate 50 and the hub 58 of the feed wheel 30 may be machined to form such a star pattern, resulting in less complicated and less precise machining than machining of the internal spline of the center hub of the HTH624C. In other embodiments, the profile of the plate 50 and corresponding profile in the hub 58 of the feed wheel 30 may take the form of other patterns. For example, in other embodiments of the adaptor plate 50, there may be as few as three or four projections on the lower end, if they provide sufficient surface contact area, or, on the upper end, there may be as many as eight projections, the number of recessed portions matching the number of projections. The adaptor plate 50 is configured as a star-shaped disk.

The peripheral ring 78 and the hub 76 are at least partially axially offset from one another so as to cooperate to provide a recessed portion 80. The adaptor plate 50 is positioned about a spigot 61 of the LH mounting flange 54 (e.g., LH spigot 61 is integrated into the LH flange 54) such that the LH spigot 61 is positioned within the recessed portion 80 of the adaptor plate 50. The inner diameter of the ring 78 is slightly larger than the outer diameter of the LH spigot 61, allowing for tolerances and slight variation in mounting of the plate 50. The hub 76 of the adaptor plate 50 is spaced axially apart from the LH spigot 61 of the LH mounting flange 54 (e.g., axial clearance of 0.1 millimeter).

The projections 70 are fixed to the LH mounting flange 54 using fasteners 82 configured, for example, as screws (e.g., DIN 912 M16×30 with quality grade 12.9). The LH mounting flange 54 has a plurality of flange holes 84 (illustratively through-holes) internally threaded to mate respectively with the externally threaded fasteners 82. The adaptor plate 50 has a plurality of unthreaded plate through-holes 86 each of which is formed in a respective one of the projections 70 and is larger in diameter than the shank 82-1 of the fastener 82 received thereby. The hub 58 has a plurality of unthreaded hub through-holes 88.

The hub through-holes 88, the recessed portions 72, the plate through-holes 86, and the flange holes 84 are respectively axially aligned with one another. The shank 82-1 of each fastener 82 extends through a respective one of the plate through-holes 86 into a respective one of the flange holes 84 so as to be threaded thereto, and the head 82-2 of that fastener 82 is arranged in axial face-to-face contact with the respective projection 70. Each projection 70 is thereby fastened to the LH mounting flange 54, coupling the adaptor plate 50 to the LH mounting flange 54. As such, the projections 70 and the LH mounting flange 54 are arranged in axial face-to-face contact. The tips of the shanks 82-1 of the fasteners 82 may be flush or generally flush with a face of the LH mounting flange 54 (it is understood that the shank 82-1 may extend beyond that face or short of that face).

The head 82-2 of each fastener 82 is positioned within a respective one of the hub through-holes 88 when the projections 70 are fitted respectively within the recessed portions 72 so as to be positioned respectively within those recessed portions 72. The inner diameter of the hub through-hole 88 is larger than the outer diameter of the head 82-2 so as to receive the head 82-2 therein.

The hub 76 of the adaptor plate 50 is fitted within the hub 58 of the feed wheel 30 so as to be positioned within the hub 58. As such, the hub 76 is positioned within the central hub through-hole 91 of the hub 58 so as to engage that through-hole 91.

The hub through-holes 66 and the hub through-holes 88 are positioned in alternating relation to one another circumferentially about the hub 58. The projection-receiving recessed portions 72 and the head-receiving recessed portions 93 are positioned in alternating relation to one another circumferentially about the hub 58.

During assembly of the frame-mounted drive 41, the frame 20 may be positioned on its back. In such a case, the feed wheel 30 is dropped into a cavity 90 between the walls 44 of the frame 20. The RH motor 40-1 is positioned in place by inserting the RH mounting flange 54 through a hole 89 machined in the respective wall 44 into the cavity 90 and mounting the housing 42 to that wall 44 using fasteners 49. Next, the hub 58 of the feed wheel 30 is fitted onto the spigot 61 of the RH mounting flange 54, and the hub through-holes 66 are circumferentially aligned with the flange holes 64 of the RH mounting flange 54. The hub 58 is then coupled to the RH mounting flange 54 using the fasteners 62 so as to mount the feed wheel 30 to the RH mounting flange 54.

Before introduction of the LH motor 40-2 and adaptor plate 50 to the head 10, on a bench or other location, the adaptor plate 50 is separately mounted to the LH mounting flange 54 of the LH motor 40-2. The peripheral ring 78 is positioned on the LH spigot 61 of the LH mounting flange 54, and the projections 70 are fastened to the second mounting ring 54 using the fasteners 82.

The LH motor 40-2 is then positioned in place by inserting the LH mounting flange 54 with the adaptor plate 50 fixed thereto through a hole 89 machined in the respective wall 44 into the cavity 90, aligning the projections 70 respectively with the recessed portions 72, inserting the projections 70 respectively into the recessed portions 72, and mounting the housing 42 of the motor 40-2 to that wall 44 using fasteners 49. To facilitate insertion of the projections 70 into the recessed portions 72, grease may put on the perimeter of the projections 70 and/or in the recessed portions 72 along the edges thereof. The drive 41 is thereby formed, in a time-efficient manner (compared, for example, to assembly of the frame-mounted drive of the HTH624C). The drive 41 is relatively compact, providing a rigid rotary connection between the rotary output elements 48 is thereby formed, with the feed wheel 30, the rotary output elements 48, and the adaptor plate 50 arranged in co-axial relation relative to the axis 31 for rotation thereabout. Disassembly of the drive 41 may be accomplished preferably by following the reverse of the assembly process.

Once the drive 41 is assembled, there are axial clearances to minimize axial forces on the motors 40-1, 40-2. For example, there is an axial clearance 97 (e.g., 2.0 millimeters) between the adaptor plate 50 and the feed wheel 30, or more particularly between the ring 78 of the adaptor plate 50 and the hub 58 of the feed wheel 30. The hub 76 of the adaptor plate 50 occupies a portion of the axial space between the spigots 61 of the RH and LH motors 40-1, 40-2 (axial space between spigots 61 is, for example, 26 millimeters), leaving an axial clearance 98 (e.g., 4.8 millimeters) between the hub 76 of the adaptor plate 50 and the RH spigot 61 of the RH motor 40-1. Such axial clearances 97, 98 are able to accommodate axial tolerance stack-up within the frame-mounted drive 41 (e.g., in the motors 40-1, 40-2, plate 50, and wheel 30), such that no shims are needed to position the motors 40-1, 40-2 axially properly relative to one another, thereby simplifying assembly of the frame-mounted drive 41.

The axial thickness of the projections 70 and the axial depth of the recessed portions 72 are sufficiently large to provide an adequate operational interface 74, further accommodating such tolerance stack-up. For example, the axial thickness of the projections 70 is 14 millimeters, the axial depth of the recessed portions 72 is 13 millimeters, and the projections 70 extend respectively into the recessed portions 72 an axial interface distance of 11 millimeters, leaving an exemplary axial clearance 97 of 2 millimeters.

In use, a human operator can command forward or reverse feeding of a tree held by the head 10. In so doing, hydraulic fluid (e.g., hydraulic oil) flows through the two motors units in the selected forward or reverse direction. The feed wheel 30 thus rotates with the RH rotary output element 48 via the mechanical connection therewith and the LH rotary output element 48 via the adaptor plate 50 such that the feed wheel 30, the rotary output elements 48, and the adaptor plate 50 rotate in unison about the axis 31. The operational interface 74 between the adaptor plate 50 and the feed wheel 30 does not need to be greased periodically, thereby eliminating a periodic grease service point from the caution zone between the arms 26. In the event the frame-mounted drive 41 calls for maintenance, such as, for example, replacement of the feed wheel 30 from time to time due to thumbnail wear (e.g., every 3000-4000 hours), the construction of the frame-mounted drive 41, in particular employment of the adaptor plate 50, simplifies the disassembly and re-assembly processes and is relatively time-efficient (compared, for example, to the frame-mounted drive of the HTH624C).

A frame-mounted drive similar to the drive 41 could be applied to other timber-working heads. For example, such a drive could be used with a debarking head having two arm-mounted drives and the frame-mounted drive 41 for feeding a tree back and forth over one or more knives of the head. Dimensions, operating parameters, etc. may be different from the drive 41 depending on the application, but the basic construction of the drive may be the same, such as use of two hydraulic motors mounted to the frame and having flanged rotary output elements, a feed wheel screwed to the mounting flange of one of the motors, an adaptor plate similar to plate 50 or the like screwed to the mounting flange of the other motor mounted to the frame and having projections received in corresponding axially recessed portions of the feed wheel.

The fasteners 49, 62, 82 are illustrated as screws in simplified, unthreaded form. The shank has a proximal portion (represented with a larger diameter) extending from the head and a distal portion (represented with a smaller diameter) extending from the proximal portion to the tip of the screw opposite the head. The proximal portion remains unthreaded, but its diameter represents the major diameter of the thread of the distal portion, the thread having been cut or otherwise formed into the distal portion in a conventional manner. The length and diameter of the distal portion represent respectively the length of the threaded portion of the screw and the minor diameter of the thread. The diameter of the distal portion of the fasteners 62, 82 is, for example, 13.9 millimeters. The mating holes to which the fasteners 49, 62, 82 are threaded are also represented in simplified, unthreaded form, it being understood that such holes may be threaded in a conventional manner for mating, threaded engagement with the fasteners 49, 62, 82. The depicted diameter of the holes 64, 84 is, for example, 14.3 millimeters (e.g., the minor diameter of the internal thread).

The contemplated welds of the timber-working head have not been shown for simplification of illustration, it being understood that it would be well within the skill of one of ordinary skill in the art to provide the welds without undue experimentation.

While the disclosure has been illustration and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A timber-working head, comprising:
a frame,
a first motor and a second motor, the first motor mounted to the frame and comprising a first rotary output element, the second motor mounted to the frame and comprising a second rotary output element,
a feed wheel fixed to the first rotary output element for rotation therewith,
an adaptor plate fixed to the second rotary output element for rotation therewith, the adaptor plate comprising radial projections arranged about the periphery of the adaptor plate and received respectively within corresponding axially recessed portions of the feed wheel so as to provide an operational interface between the adaptor plate and the feed wheel.

2. The head of claim 1, wherein each projection is configured as a lobe, and each recessed portion has a generally matching profile.

3. The head of claim 1, wherein each projection is generally trapezoidal.

4. The head of claim 1, wherein the feed wheel comprises a hub, and the recessed portions are formed in an axially-facing wall of the hub.

5. The head of claim 1, wherein the first rotary output element is configured as a mounting flange, the feed wheel comprises a hub, and the hub is fixed to the mounting flange using fasteners.

6. The head of claim 5, wherein the mounting flange comprises a plurality of flange holes, the hub comprises a plurality of hub through-holes respectively axially aligned with the flange holes and arranged circumferentially between the recessed portions, and each fastener is extends through a respective one of the hub through-holes into a respective one of the flange holes.

7. The head of claim 5, wherein the second rotary output element is configured as a mounting flange, and the projections are fixed to the mounting flange of the second rotary output element using fasteners.

8. The head of claim 1, wherein the second rotary output element is configured as a mounting flange, and the projections are fixed to the mounting flange using fasteners.

9. The head of claim 8, wherein the mounting flange comprises a plurality of flange holes, the adaptor plate comprises a plurality of plate through-holes each of which is formed in a respective one of the projections, and each fastener extends through a respective one of the plate through-holes into a respective one of the flange holes.

10. The head of claim 9, wherein the feed wheel comprises a hub, the hub comprises a plurality of hub through-holes respectively axially aligned with the recessed portions, the plate through-holes, and the flange holes, and each fastener is positioned within a respective one of the hub through-holes.

11. The head of claim 10, wherein the mounting flange is a second mounting flange, the flange holes are second flange holes, the hub through-holes are second hub through-holes, the fasteners are second fasteners, the first rotary output element is configured as a first mounting flange, the hub is fixed to the first mounting flange using first fasteners, the first mounting flange comprises a plurality of first flange holes, the hub comprises a plurality of first hub through-holes respectively axially aligned with the first flange holes and arranged circumferentially between the recessed portions, each first fastener extends through a respective one of the first hub through-holes into a respective one of the first flange holes, and the first hub through-holes and the second hub through-holes are positioned in alternating relation to one another circumferentially about the hub.

12. The head of claim 11, wherein the first mounting flange comprises a spigot, the second mounting flange comprises a spigot, the spigot of the first mounting flange is positioned within the hub of the feed wheel, the adaptor plate comprises a hub and a peripheral ring positioned radially outward of that hub and comprising the projections, the peripheral ring and the hub of the adaptor plate are at least partially axially offset from one another so as to cooperate to provide a recessed portion, the spigot of the second mounting flange is positioned within the recessed portion of the adaptor plate, and the hub of the adaptor plate is positioned within the hub of the feed wheel.

13. The head of claim 1, wherein the feed wheel comprises a hub, the first rotary output element is configured as a mounting flange to which the feed wheel is fixed using fasteners, and the mounting flange comprises a spigot positioned within the hub of the feed wheel.

14. The head of claim 1, wherein the second rotary output element is configured as a mounting flange to which the projections are fixed using fasteners, the adaptor plate comprises a hub and a peripheral ring positioned radially outward of the hub and comprising the projections, the peripheral ring and the hub are at least partially axially offset from one another so as to cooperate to provide a recessed portion, and the mounting flange comprises a spigot positioned within the recessed portion of the adaptor plate.

15. The head of claim 1, wherein the feed wheel comprises a hub, and the adaptor plate comprises a hub positioned within the hub of the feed wheel.

16. The head of claim 1, wherein the second rotary output element is configured as a mounting flange to which the projections are fixed, and the projections and the mounting flange are arranged in axial face-to-face contact.

17. The head of claim 1, comprising an axial clearance between the adaptor plate and the feed wheel.

18. The head of claim 1, wherein the adaptor plate is configured as a star-shaped disk.

* * * * *

UNITED STATES PATENT AND TRADEMARK OFFICE
CERTIFICATE OF CORRECTION

| | | |
|---|---|---|
| PATENT NO. | : 7,938,154 B2 | Page 1 of 1 |
| APPLICATION NO. | : 12/483296 | |
| DATED | : May 10, 2011 | |
| INVENTOR(S) | : Peter Quirke, Alex J. Stevenson and Paul Gamble | |

It is certified that error appears in the above-identified patent and that said Letters Patent is hereby corrected as shown below:

On the Title Page

In the list of inventors, Item (75), "Gambie" is changed to --Gamble-- thereby correcting the surname.

Signed and Sealed this
Twenty-second Day of October, 2013

Teresa Stanek Rea
*Deputy Director of the United States Patent and Trademark Office*